April 2, 1968        P. L. AARON        3,375,748

TEACHING DEVICE FOR MUSICAL NOTATION

Filed Jan. 27, 1966        2 Sheets-Sheet 1

INVENTOR
PHILLIP L. AARON

BY *Alvin Browdy*

ATTORNEY

April 2, 1968 P. L. AARON 3,375,748
TEACHING DEVICE FOR MUSICAL NOTATION
Filed Jan. 27, 1966 2 Sheets-Sheet 2

INVENTOR
PHILLIP L. AARON
BY *Alvin Browdy*
ATTORNEY

United States Patent Office 3,375,748
Patented Apr. 2, 1968

3,375,748
TEACHING DEVICE FOR MUSICAL NOTATION
Phillip L. Aaron, 2916 N. 29th St.,
Milwaukee, Wis. 53210
Filed Jan. 27, 1966, Ser. No. 523,368
10 Claims. (Cl. 84—471)

The present invention relates to a teaching device for musical notation, and more particularly to a teaching device for musical notation which includes a grid with provision for indicating the duration of a note by the horizontal extent of a marking element or elements.

Many devices have heretofore been provided to assist in the teaching of musical notation to those unfamiliar with it. These devices have generally been somewhat complex in their construction, and have been intended for teaching of students who could readily grasp the concepts involved, for instance the teaching of students who are six or seven years old, or older. It is desirable, however, to instruct even younger children in musical notation, including those of pre-school age, such as four and five years of age. The known devices for teaching musical notation have not been constructed so that the teaching of students of such age could be accomplished.

In order to permit the teaching of musical notation to children in the lower age group, a teaching device should be of relatively simple construction, and should be so organized that it readily captures and holds the attention and imagination of children of the particular age group. Preferably, and importantly, the teaching device should have the element of a "game" in it, so as to take maximum advantage of the limited span of attention of such students. In addition, in order to provide more than the mere basic concepts, a suitable teaching device should also provide for the teaching of pitch alterations and sharps and flats.

An object of the present invention is to provide a teaching device for musical notation which is of simple construction.

Another object of the present invention is the provision of a teaching device for musical notation which is suitable for teaching students who are very young.

Still another object of the present invention is to provide a teaching device for musical notation which will capture the attention and imagination of very young students.

Yet another object of the present invention is the provision of a teaching device embodying a game-like challenge.

A further object of the present invention is to provide a teaching device for musical notation permitting the teaching of pitch alteration, etc.

Other objects and many of the attendant advantages of the present invention will be readily understood from the following specification and drawings, wherein.

Figure 1:
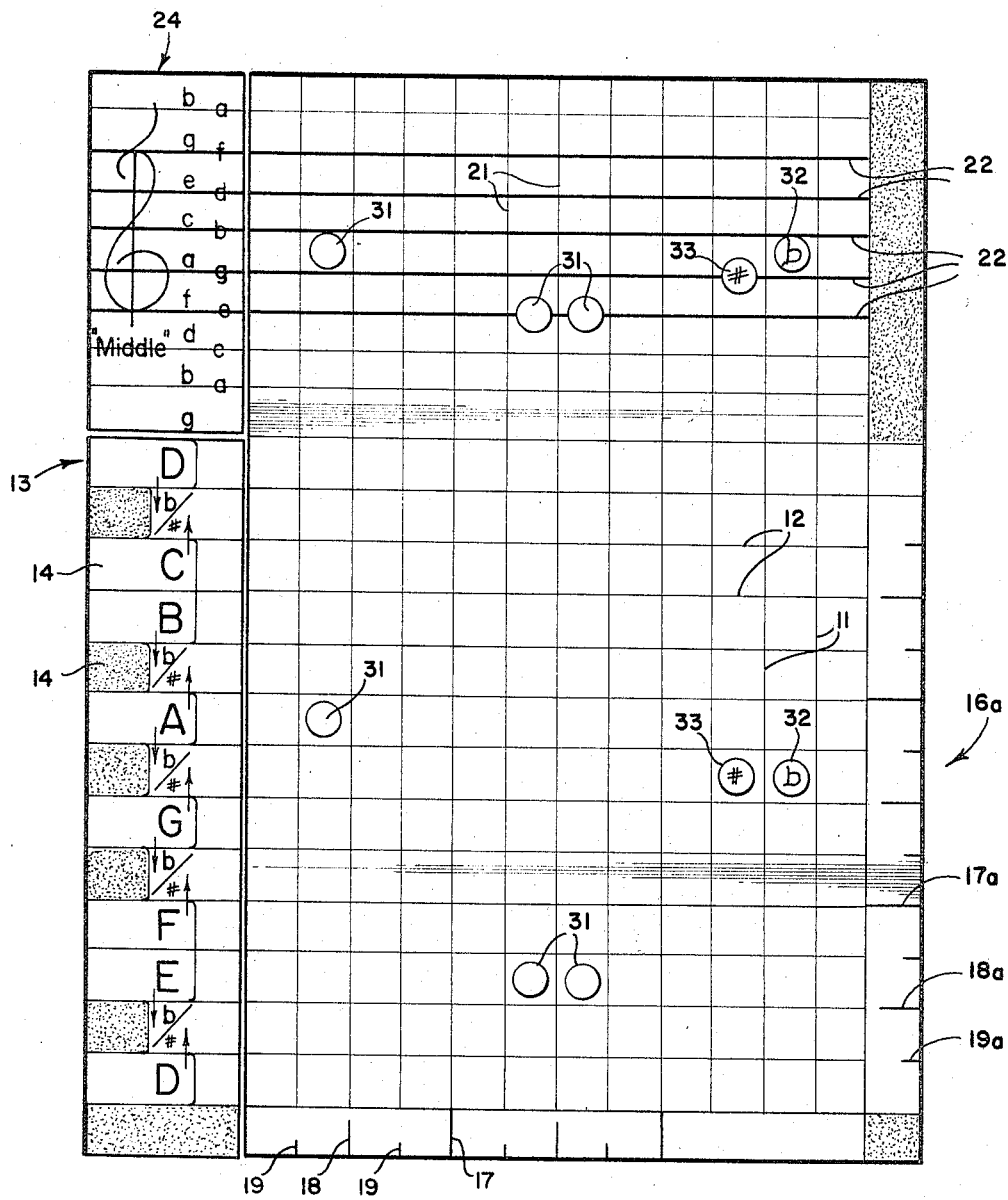
FIG. 1 is a view of a grid-like device forming part of the teaching device of the present invention.

Referring now to the drawings, wherein like or corresponding reference numerals are used to designate like or corresponding parts throughout the several views, there is shown in FIG. 1 a teaching device element generally designated 10, and comprising vertical lines 11 and horizontal lines 12. Both the lines 11 and lines 12 are equally spaced. Along the left margin of the grid is a representation 13 of part of a piano key board extending from D below middle C to D above middle C, and including individual key representations 14 which may be printed adjacent the grid 10. Each key representation 14 is adjacent each of the other key representations 14, and each is in a space between adjacent horizontal lines 12.

Along the lower margin of the grid is a scale 16 having unit markers 17, half markers 18 and quarter markers 19. This scale arrangement is provided to agree with the common note duration notation of whole notes, half notes, quarter notes, etc., and may be specifically varied in different embodiments of the invention to achieve even finer gradations than shown in the drawing for illustrative purposes. Along the right-hand margin of the grid is a scale 16a having unit markers 17a, half markers 18a and quarter markers 19a. This scale arrangement is provided to agree with the relative "highness" and "lowness" of pitch representation as designated by the "keys" of the key boards 13, 17 and 28 and may be specifically varied in different embodiments of the invention to achieve even finer gradations than shown in the drawing for illustrative purposes.

At the upper part of FIG. 1, and above the grid proper, there may be seen a grouping of five horizontal lines 22, which are preferably heavier than the lines 11 and 12 forming the grid. These five lines form a staff, and are traversed by the vertical lines 21 which are in registry with the vertical lines 11 forming a part of the grid. Alternatively, of course, lines 11 may extend through the lines 22 without interruption. A treble clef symbol 24 may be printed adjacent the staff lines 22.

Figure 3:
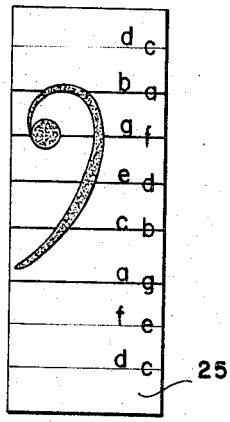
FIG. 3 is a treble clef symbol and part of a staff, usable with the device shown in FIG. 1.
Figure 4:
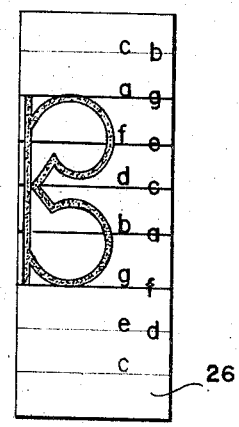
FIG. 4 is a bass clef symbol and part of a staff.
Figure 5:
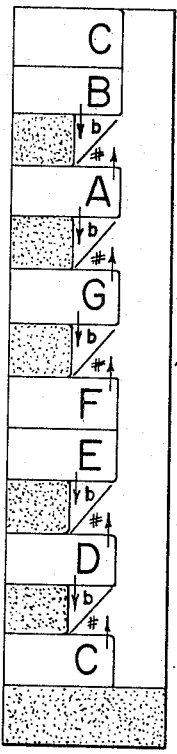
FIG. 5 is a key board representation extending from C to C.
Figure 6:
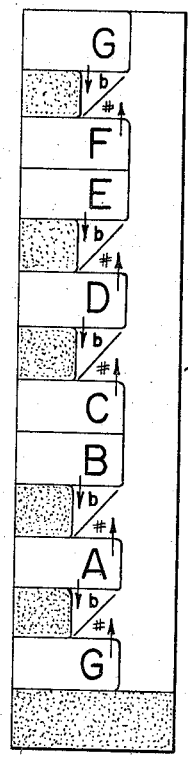
FIG. 6 is a key board representation extending from G to G.
Figure 7:
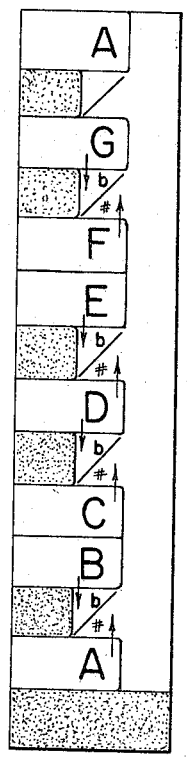
FIG. 7 is a key board representation extending from A to A.

The bass clef 25 shown in FIG. 3 or the alto clef 26 shown in FIG. 4 may be placed in position adjacent the staff lines 22. Similarly, and as shown in FIGS. 5, 6 and 7, the separate key board representation 27, extending from C to C or the separate key board representation 28 extending from G to G or the separate key representation 29 extending from A to A may replace the key board representation 13 in order to alter the basic conditions and facts of the teaching situation.

Figure 2:
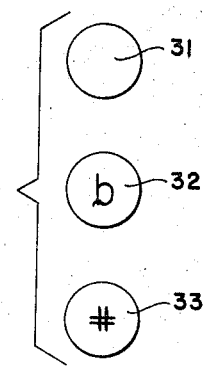
FIG. 2 illustrates a group of markers suitable for use with the teaching device of the present invention.

In order to provide markers for notation of the musical notes, disks such as shown in FIG. 2 may be provided, there being shown a marker disk 31 which is plain or unmarked, a marker disk 32 with a "flat" symbol thereon and a marker disk 33 with a "sharp" symbol thereon. As many of the marker disks of each type may be provided as are deemed necessary.

In using the herein disclosed teaching device, the instructor presents the student with a problem as, for example, by placing a marker disk 31 within one of the spaces of the grid 10 corresponding to one of the white key pitch representations of the key boards 13, 27, 28 or 29. The student then selects the corresponding pitch location between or on the lines 22 of the staff and, assuming that the note presented is a "quarter" note (designated as a "quarter-inch" note to relate the concept of pitch duration to the linear measurement of a "ruler"), the student places an unmarked disk 31 on the appropriate location on the staff 22. This is illustrated by the "A" above "middle C" on the left of FIG. 1. If the problem note given by the instructor is a "half" note, however, the student must utilize *two* of the disks 31 as these two together serve to indicate to the student that a "half-inch" note is of *twice* the duration of a "quarter." This is illustrated by the notes "E" above "middle C" in the center of FIG. 1. As will be apparent, other representations of pitch and duration may be presented to the student by the interchangeability of the clefs 24, 25 and 26 and the octave segments 13, 27 and 29 to realize the most-used segment of the gamut of available tones.

To facilitate the teaching of "chromatic" pitch alteration (e.g. the means employed to designate "black-key" pitches in modern notation) the disks 32 and 33 are employed as follows: Since the key boards 13, 27, 28 and 29 are (in the physical representations of their keys) corresponding to the vertical scale on the right-hand of the grid 10 (e.g. are equidistant), the pitches represented by "black-keys" need not be shown on a staff 22 by their own "line" or "space" since a "G" literally "displaced" to the right/above is made more intense in tonal value (e.g. is "sharped") and represents the same pitch (within the system of the equally-tempered scale in universal use today) as an "A" literally "displaced" to the left/below in the course of which it is weakened in tonal value (e.g. is "flatted"). This is shown on the right of FIG. 1 by means of the disks 33 and 32, respectively. It can readily be seen that the "staff" is considerably more compact in physical size than the "graph" to which it corresponds and by means of this device a student can become aware of why the first-line to first-space of the "treble" staff represents a half/semi-tone of pitch difference and the second-line to second-space of the "treble" staff represents a whole-tone of pitch difference (e.g. E–F and G–A, respectively).

It will be appreciated that the treble clef 24 may be provided solely as a separate element, as may be the key board representation 13. Also, other parts of the key board than those shown may be provided, either integrally with the grid, or separate from it as provided in FIGS. 5 and 7, in order to extend the range of the student's knowledge. Further, the surface of the teaching device may be coated so as to receive a crayon or similar marking, which may be removed so as to obviate the use of the marker disks.

There has been provided a teaching device which is of extremely simple construction, and which is particularly suited for the teaching of pre-school children. The teaching device disclosed captures the attention and imagination of the young children, and enhances the learning process by challenging the young student with a contest or game. Further, the teaching device of the present invention is not limited to the most elemental concepts of musical notation, but provides for extension into more sophisticated musical notation concepts.

It will be obvious to those skilled in the art that various changes may be made without departing from the spirit of the invention and therefore the invention is not limited to what is shown in the drawings and described in the specification but only as indicated in the appended claims.

What is claimed is:

1. A teaching device for musical notation comprising a grid having equally spaced vertical lines and equally spaced horizontal lines, a representation of at least part of a piano key board at one side of said grid with adjacent key representations in the adjacent spaces between the horizontal lines, and means for indicating by vertical position on said grid the pitch of a selected note and by horizontal extent on the grid the duration of the selected note.

2. The teaching device of claim 1, and a representation of a musical staff above said grid defined by a series of five equally spaced horizontal lines and vertical lines through said five horizontal lines and in alignment with the vertical lines of said chart.

3. The teaching device of claim 2, and plural means of equal horizontal extent for indicating by their vertical positions on said staff representation the pitch of selected notes, said last mentioned means each including means for representing the duration of selected notes.

4. The teaching device of claim 2, and a musical clef representation integral with said musical staff.

5. The teaching device of claim 2, and a musical clef representation separate from said musical staff.

6. The teaching device of claim 1, said piano key boards representation being integral with said grid.

7. The teaching device of claim 1, said piano key boards representation being separate from said grid.

8. The teaching device of claim 1, and a scale at an edge of said grid extending horizontally and in registry with the vertical lines.

9. The teaching device of claim 8, said scales having unit, half and quarter markings thereon.

10. The teaching device of claim 1, and a scale at an edge of said grid extending vertically and in registry with said horizontal lines.

References Cited
UNITED STATES PATENTS

| | | | |
|---|---|---|---|
| 539,191 | 5/1895 | Pond | 84—471 |
| 939,127 | 11/1909 | Giffin | 84—471 |
| 1,526,547 | 2/1925 | Hughey | 84—471 |

ROBERT S. WARD, Jr., *Primary Examiner.*